United States Patent [19]

Matagrano

[11] 4,326,614
[45] Apr. 27, 1982

[54] DISC CALIPER CLUTCH WITH EASY ACCESS AND BURNOUT PROOF ROTOR

[76] Inventor: Theodore T. Matagrano, 59-29 Palmetto St., Ridgewood, N.Y. 11385

[21] Appl. No.: 151,252

[22] Filed: May 19, 1980

[51] Int. Cl.³ .................... F16D 13/50; F16D 69/04
[52] U.S. Cl. .................... 192/70.13; 188/218 XL; 188/245; 192/70.19; 192/107 R; 192/109 R
[58] Field of Search ............. 192/70.13, 70.19, 70.2, 192/70.27, 70.28, 70.29, 70.3, 107 R, 109 R; 188/70.2, 73.3, 244, 245, 250 G, 73.2, 73.6

[56] References Cited

U.S. PATENT DOCUMENTS

| | | | |
|---|---|---|---|
| 1,834,242 | 12/1931 | Hollingsworth | 192/107 R |
| 1,913,802 | 6/1933 | Gregory | 192/70.13 X |
| 2,541,979 | 2/1951 | Amundsen | 192/107 R |
| 3,194,347 | 7/1965 | Hall | 192/107 R X |
| 3,396,824 | 8/1968 | Meier | 188/73.3 X |
| 3,521,731 | 7/1970 | Labat | 192/70.3 X |
| 3,887,051 | 6/1975 | Bignell | 192/109 RX |
| 4,226,318 | 10/1980 | Morgan | 192/109 R X |

FOREIGN PATENT DOCUMENTS 2446962  9/1980  France .......................... 188/245

Primary Examiner—Allan D. Herrmann
Attorney, Agent, or Firm—Richard L. Miller

[57] ABSTRACT

A disc caliper clutch, including a rotor slidable along a spline of a shaft so as to frictionally engage with two plates between which the rotor is sandwiched; each of the plates being fitted with friction pads on its side and against which the rotor abuts, the pads being made easily replaceable, and one of the plates being additionally fitted with stop blocks so as to limit the amount of wear on the friction pads before requiring replacement and thus prevent damage to the rotor.

2 Claims, 5 Drawing Figures

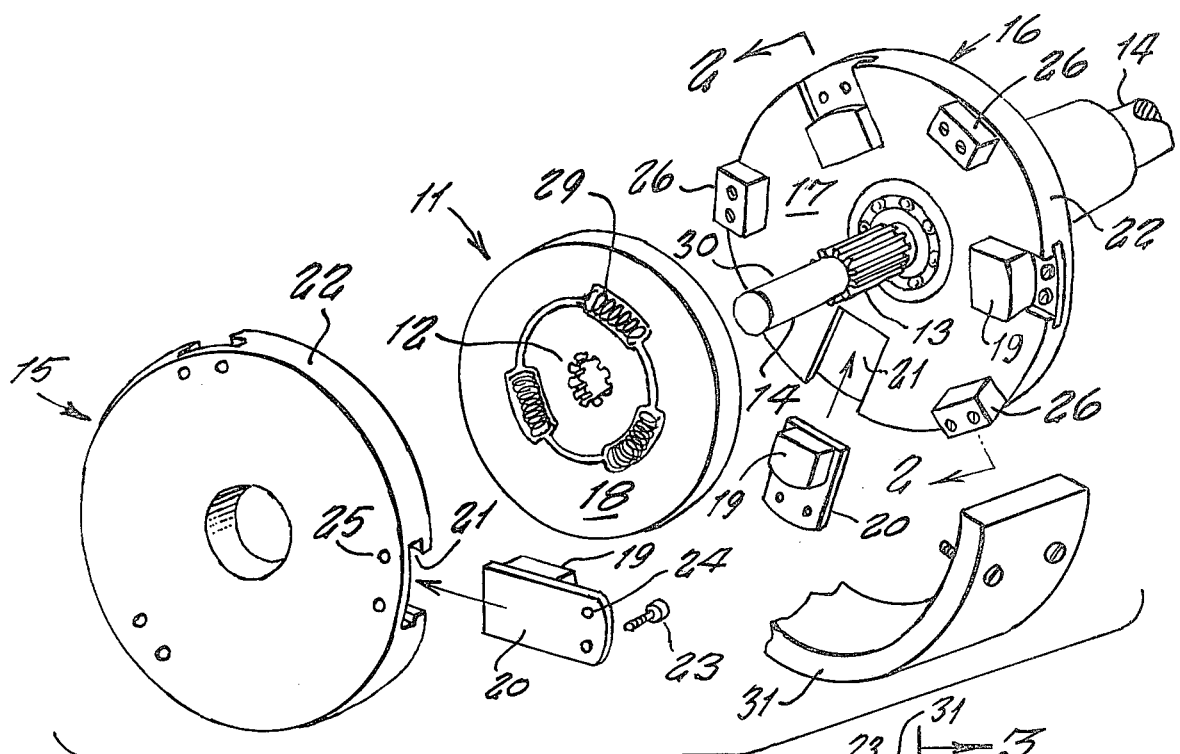
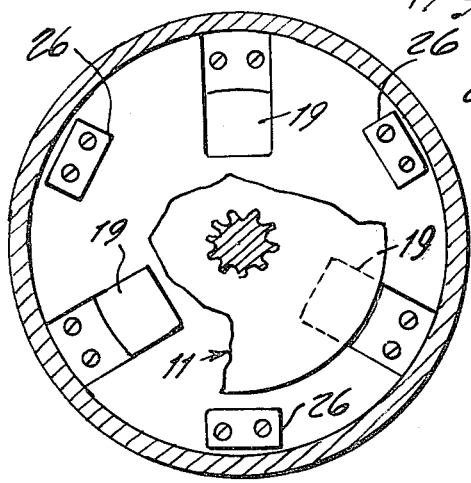
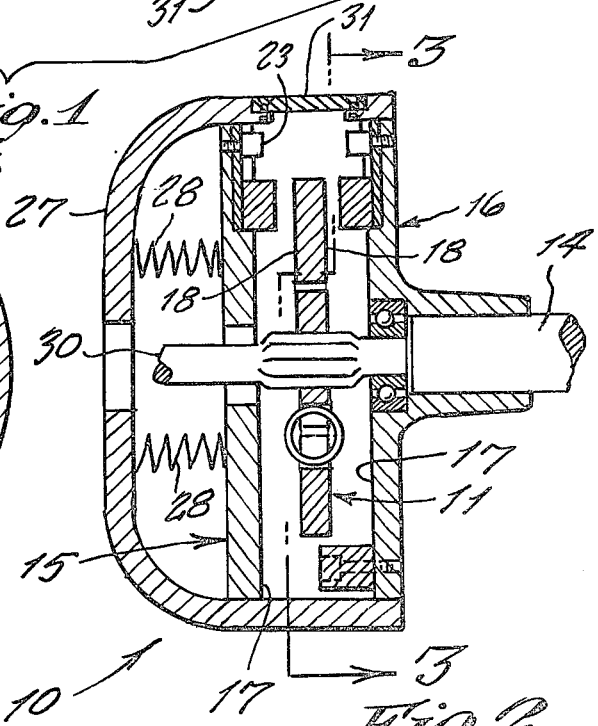
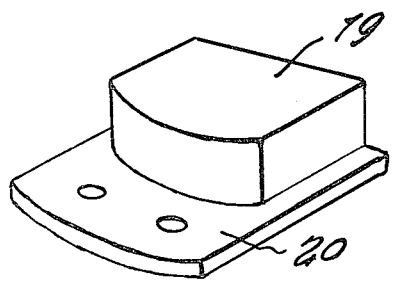
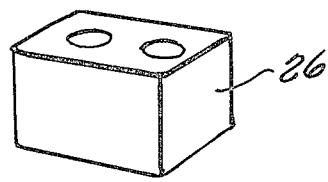

DISC CALIPER CLUTCH WITH EASY ACCESS AND BURNOUT PROOF ROTOR

BACKGROUND OF THE INVENTION

This invention relates generally to automotive vehicle clutches.

It is well known to those acquainted with the particular field that after a long time of use, a clutch mechanism of a vehicle becomes worn out, and the clutch face plate friction pads become worn thin so that they must be replaced with new friction pads. On conventional clutches now used on automotive vehicles, this necessitates the engine-transmission separation in order to gain access to the pads, and which dismantling operation is accordingly time consuming and costly. This situation is objectionable, and is therefore in need of an improvement.

SUMMARY OF THE INVENTION

Therefore it is a principal object of the present invention, to provide a disc caliper clutch wherein the friction pads are easily accessible without need of the engine-transmission separation, so that this friction pad replacement service can be quickly and easily accomplished in order to be less costly to the owner, etc.

Another object is to provide a disc caliper clutch wherein stop blocks are included to automatically operate when the clutch friction pads become excessively worn and require replacement, and thus prevent burning out of metal components by scraping against other metal components.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The FIGS. on the drawings are briefly described as follows:

FIG. 1 is an exploded perspective view of the invention.

FIG. 2 is a cross sectional view on line 2-2 of FIG. 1, showing the components assembled.

FIG. 3 is a cross sectional view on line 3-3 of FIG. 2.

FIG. 4 is a perspective view of a typical, replaceable clutch shoe.

FIG. 5 is a perspective view of one of the stop blocks.

DETAILED DESCRIPTION OF THE PREFERRED EMBODIMENTS

Referring now to the drawing in greater detail, the reference numeral 10 represents a disc caliper clutch according to the present invention, wherein there is a circular rotor 11 having a splined central opening 12 for sliding axially along a spline 13 of a drive shaft 14 so that the rotor can be pressed between two circular, rear and front plates 15 and 16 between which the rotor is sandwiched.

Each of the plates 15 and 16 are provided on a side 17 facing toward a side 18 of the rotor with a set of at least two (three, however are illustrated in drawings) radially equally spaced apart, friction pads 19 for frictionally engaging the rotor side 18. These friction pads in time become worn down from rubbing against the face of the rotor side, so that the pads must necessarily be replaced.

In the present invention easy access is provided to the pads for such replacement. Each pad is mounted upon a steel backing plate 20 that is slided into a radially extending groove 21 on plate side 17 and which opens out on a peripheral edge 22 of the plate so that it may be slided therein. The baking plate is then secured in the groove by means of bolts 23 fitted in clearance holes 24 and threaded holes 25 of the two plates.

Additionally, one of the circular plates 16 includes at least two (three illustrated in drawings), radially equally spaced apart stop blocks 26 bolted to the side 17 thereof, and being positioned so as to abut against the other plate 15 when the pads 19 become excessively worn thin, thus preventing scoring or burning of metal components scraping against each other, such as occurs in conventional clutches. In the present invention, when the stop blocks engage the plate the clutch will simply slip, and not operate, thus calling attention that the pads need replacement.

It is to be noted that instead of bolting the stop blocks directly to the circular plates, as shown, they may be mounted on the backing plate 20 instead, as preferred by a manufacturer.

The pressure pads facing against both opposite sides of the rotor as illustrated thus form a triple caliper setup.

The circular plates 15 and 16 are contained inside a bell housing 27 into which the driveshaft extends.

It is to be further understood that a plurality of compression coil springs 28 and other mechanism (which is not shown) between an end wall of the bell housing and a rear side of the plate 15 are necessary in order to apply pressure to plate 15 when required.

Also shown for clarity are shock absorbing spring 29 as is generally conventional in many clutches.

In the present invention when it is required to transmit power the plate 15 is forced against the rotor 18 which is thus sandwiched between plates 15 and 16 so that the rotor and bell housing turn as one unit along with plates 15 and 16.

Conversely when it is required that power not be transmitted the plate 15 is not forced or biased against the rotor 18.

This clutch will transmit power in either direction and either shaft 14 or 30 may be used as input and output shafts as required by the properties of the device it is installed in.

It is to be additionally noted that in order to service this clutch access through the bell housing is provided by removing an access plates 31 so that pad assembly 19 and 20 may be replaced without a great deal of disassembly of the clutch itself.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A disc caliper clutch, comprising in combination, a rotor slidable on a spline of a shaft, said rotor being sandwiched between a front and rear circular plate so as to be engaged by both said plates, and each said plate having friction pads on a side thereof for frictionally engaging said rotor, means for easy removal of said pads for replacement thereof, wherein each said pad is mounted on a backing plate removably bolted to said circular plates, and one said circular plate carries a plurality of stop blocks that abut with a surface of the other said circular plate when said pads become excessively worn down so as to prevent damage form occurring to said rotor.

2. The combination as set forth in claim 1 wherein at least one said backing plate carries a stop block that abuts with an assembly of other said backing plate when said pads become excessively worn down so as to prevent damage from occurring to said rotor.

* * * * *